United States Patent
Ye et al.

(10) Patent No.: US 6,917,713 B2
(45) Date of Patent: Jul. 12, 2005

(54) SYSTEM AND METHOD FOR ENHANCING VIDEOS FROM DRIFT-FREE SCALABLE BITSTREAM

(75) Inventors: Jong Chul Ye, Croton-on-Hudson, NY (US); Yingwei Chen, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 601 days.

(21) Appl. No.: 10/157,666

(22) Filed: May 29, 2002

(65) Prior Publication Data

US 2003/0223642 A1 Dec. 4, 2003

(51) Int. Cl.⁷ .............................................. G06K 9/46
(52) U.S. Cl. ..................................... 382/236; 382/240
(58) Field of Search .............................. 382/168, 170, 382/171, 233, 236, 238, 239, 240, 246, 250, 251, 254; 375/240.01, 240.12, 240.16, 240.19, 240.2, 240.21, 240.23, 240.25; 341/50, 59, 67

(56) References Cited

U.S. PATENT DOCUMENTS

| | | | | |
|---|---|---|---|---|
| 5,278,646 A | * | 1/1994 | Civanlar et al. | 375/240.25 |
| 6,462,681 B1 | * | 10/2002 | Van Der Vleuten et al. | 341/50 |
| 6,519,285 B2 | * | 2/2003 | Yamaguchi et al. | 375/240.12 |
| 6,580,754 B1 | * | 6/2003 | Wan et al. | 375/240.01 |
| 6,618,445 B1 | * | 9/2003 | Peng et al. | 375/240.25 |
| 6,731,811 B1 | * | 5/2004 | Rose | 382/238 |
| 6,789,123 B2 | * | 9/2004 | Li et al. | 709/231 |
| 6,839,384 B2 | * | 1/2005 | Yamada | 375/240.12 |
| 2002/0181587 A1 | * | 12/2002 | Vetro | 375/240.12 |
| 2003/0206595 A1 | * | 11/2003 | Peng et al. | 375/240.25 |

OTHER PUBLICATIONS

Zhang, R. et al., "Optimal Estimation for Error Concealment in Scalable Video Coding," Conference Record of the Thirty-Fourth Asilomar Conference on Signals, Systems and Computers, 2000, vol. 2, 2000.

* cited by examiner

*Primary Examiner*—Andrew W. Johns
*Assistant Examiner*—Amir Alavi

(57) ABSTRACT

A scalable decoder system having a decoder reconstruction system, wherein the decoder reconstruction system comprises: an estimation algorithm $$\tilde{x}_{i,n}^e = a_{i,n} + E_Z\{d_{i,n}(\rho; \tilde{x}_{i,n-1}^e + Z)\}$$

for estimating a lost discrete cosine transform (DCT) coefficient, which incorporates the quantization noise of previous enhancement layer data into the expectation, wherein the estimation algorithm includes a density distribution dependent on at least one unknown parameter $\hat{\alpha}_l$; and a parameter estimation algorithm for estimating $\hat{\alpha}_l$ according to the equation:

$$\hat{\alpha}_l = -\frac{\log(1 - \hat{P}_l)}{b_l},$$

wherein $b_l$ denotes each of a set of quantizer decision levels l, and $\hat{P}_l$ is the sum of a set of a normalized frequency of occurrences of data quantized to each quantizer decision level 1,2, ... , l.

9 Claims, 3 Drawing Sheets

SYSTEM AND METHOD FOR ENHANCING VIDEOS FROM DRIFT-FREE SCALABLE BITSTREAM

BACKGROUND OF THE INVENTION

1. Technical Field

The present invention relates generally to scalable decoders, and more specifically relates to a system and method of improving decoding quality by analyzing the statistical properties of the enhancement layer information from the current and reference frames.

2. Related Art

As the popularity of systems utilizing compressed data standards, such as MPEG, H.26×, etc., continues to grow, the ability to efficiently process and communicate compressed data remains an ongoing challenge. One of the challenges of transmitting compressed video involves the sensitivity to network impairments. Because compressed video uses predictive coding algorithms and variable-length coding, transmission channel problems can result in error propagation or "drift." In particular, motion compensation, which is widely used, allows the error to propagate both temporally and spatially. Because of this, new techniques are required that limit the extent of error propagation.

In recent years, the development of scalable video encoders has focused on eliminating the drift by providing systems in which the base layer (BL) is predicted only from base layer. This strategy has been taken one step further in the development of MPEG-4 Fine Granularity Scalability (FGS) systems, in which the enhancement layer (EL) is also predicted only from BL. However, while recent scalable video coding algorithms are becoming more efficient at compressing the video, they lose compression efficiency because they ignore all EL information when predicting the BL.

The coding efficiency can be increased by optimally combining the quantizer information of the BL and EL by modeling the evolution of DCT coefficients during the encoding process. While this approach improves the rate-distortion performance of the overall coder, it is also prone to drift in variable bandwidth channels, since the EL packets can be dropped irregularly depending on the traffic conditions.

Furthermore, previous attempts to improve the drift-free scalable video coder require significant modifications to the encoder structure. Such modifications are not always feasible for improving the existing drift-free scalable video codec, such as MPEG-4 Fine Granular Scalability (FGS).

SUMMARY OF THE INVENTION

The present invention addresses the above-mentioned problems, as well as others, by providing a scalable decoder having a parameter estimation and optimal reconstruction (PEOR) system and method for choosing the optimal reconstruction point of the dequantizer. In a first aspect, the invention provides a scalable decoder system having a decoder reconstruction system, wherein the decoder reconstruction system comprises: an estimation algorithm for estimating a lost discrete cosine transform (DCT) coefficient, wherein the estimation algorithm includes a density distribution dependent on at least one unknown parameter $\hat{\alpha}_l$; and a parameter estimation algorithm for estimating $\hat{\alpha}_l$ according to the equation:

$$\hat{\alpha}_l = -\frac{\log(1 - \hat{P}_l)}{b_l},$$

wherein $b_l$ denotes each of a set of quantizer decision levels l, and $\hat{P}_l$ is the sum of a set of a normalized frequency of occurrences of data quantized to each quantizer decision level 1, 2, ..., l. The estimation algorithm is given by:

$$\tilde{x}^e_{i,n} = a_{i,n} + E_Z\{d_{i,n}(\rho; \tilde{x}^e_{i,n-1} + Z)\},$$

wherein Z is a quantization noise, $E_z$ is an expectation with respect to quantization noise Z, $$d_{i,n}(\rho; \tilde{x}^e_{i,n-1} + Z)$$

denotes a reconstruction offset, $$\tilde{x}^e_{i,n-1}$$

is an expectation of a DCT coefficient of a previous frame, $\rho$ equals a predetermined value between −1 and 1, and $a_{i,n}$ is a beginning of a quantization interval.

In a second aspect, the invention provides a parameter estimation and optimal reconstruction (PEOR) method for use in a scalable decoder, the method comprising: determining the set of quantization occurrences; estimating a parameter $\alpha$, wherein $\alpha$ is estimated according to the equation $$\hat{\alpha}_l = -\frac{\log(1 - \hat{P}_l)}{b_l},$$

wherein $b_l$ denotes each of a set of quantizer decision levels l, and $\hat{P}_l$ is the sum of a set of a normalized frequency of occurrences of data quantized to each quantizer decision level 1, 2, ..., l; generating a preliminary reconstruction point according to the equation $$\tilde{x}^e_{i,n} = a_{i,n} + d_{i,n}(\rho; \tilde{x}^e_{i,n-1});$$

and smoothing the preliminary reconstruction point to generate an optimal reconstruction point.

In a third aspect, the invention provides a parameter estimation and optimal reconstruction (PEOR) system for use in a scalable decoder, comprising: a reconstruction system for determining an optimal reconstruction according to the equation:

$$\tilde{x}^e_{i,n} = a_{i,n} + E_Z\{d_{i,n}(\rho; \tilde{x}^e_{i,n-1} + Z)\},$$

wherein Z is a quantization noise, $E_z$ is an expectation with respect to quantization noise Z, $$d_{i,n}(\rho; \tilde{x}^e_{i,n-1} + Z)$$

denotes a reconstruction offset, $\tilde{x}^e_{i,n-1}$ is an expectation of a discrete cosine transform (DCT) coefficient of a previous frame, ρ equals a predetermined value between −1 and 1, and $a_{i,n}$ is a beginning of a quantization interval.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Overview

Figure 1:
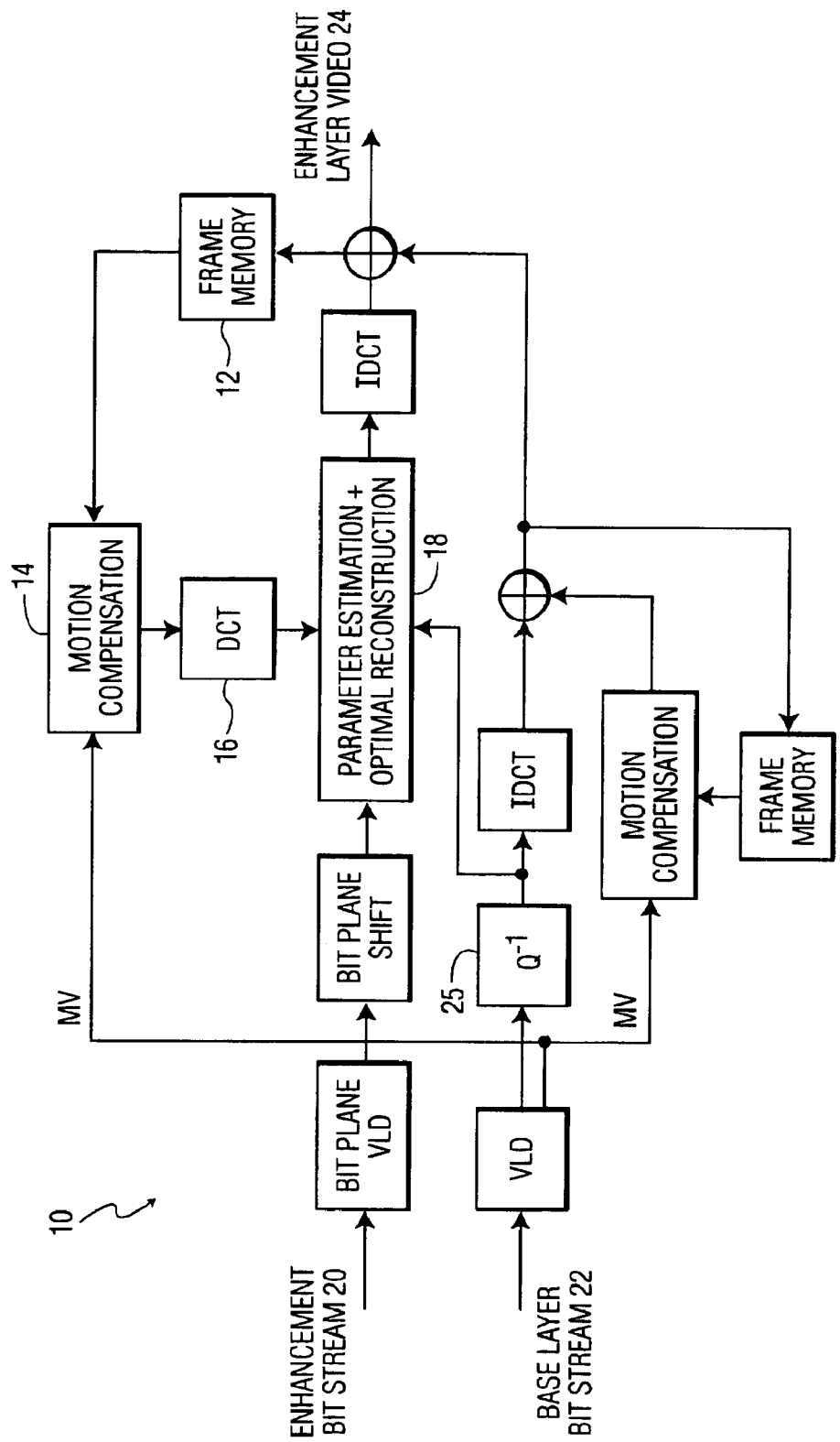
FIG. 1 depicts a scalable decoder system in accordance with the present invention.

In contrast to the conventional methods, the present invention provides a decoder system that exploits the redundant information of the encoded bitstream in the spatial and temporal direction to improve the decoder's efficiency. The invention does not require changes to existing drift-free scalable encoders, or the bitstream syntax. Thus, for a given bitstream, the invention provides consistently improved decoded video quality relative to existing decoders in terms of overall signal-to-noise ratio (PSNR).

The invention further develops the idea set forth in the paper "Optimal Estimation for Error Concealment in Scalable Video Coding," by R. Zhang, S. L. Regunathan and K. Rose, Conference Record of the Thirty-Fourth Asilomar Conference on Signals, Systems and Computers, 2000, Volume: 2, 2000 (hereinafter "Zhang reference paper"), which describes a algorithm for error concealment in scalable video coding and is hereby incorporated by reference. The present invention, however, extends and improves the ideas of the Zhang reference paper to provide consistently better video quality in terms of PSNR. Furthermore, as shown below, the present invention does not require training of the parameters, and is therefore more practical in many video applications. In addition, unlike the cited reference, the present invention can be applied to improve the decoder performance when no transmission errors occur.

The Zhang reference paper provides a mechanism for error concealment of scalable video coding by mitigating damage caused by packet loss at the enhancement layer. The reference makes full use of the information in the DCT domain available at the decoder from both the current base layer and prior enhancement layer frames. It employs a statistical model for the evolution of transform coefficients from frame to frame and implements the optimal estimate of the reconstructed coefficients.

More specifically, the evolution of a DCT coefficient in time ("from frame to frame") may be modeled by the first-order Markov process:

$$x_{i,n} = \rho x_{i,n-1} + w_{i,n}, \quad (1)$$

where $x_{i,n}$ is the ith DCT coefficient in frame n, and $x_{i,n-1}$ is the DCT coefficient in the previous frame that was mapped to it by motion compensation, $w_{i,n}$ denotes an independent innovation generating process and ρ is the AR coefficient having an absolute value less than 1.

Consider a scenario where an enhancement layer packet has been lost and a block needs to be reconstructed. They first use the information provided by the (error-free) base layer that determines (via its quantization interval) a corresponding interval in which the original DCT coefficient value must lie:

$$x_{i,n} \in (a_{i,n}, b_{i,n}). \quad (2)$$

Further, let $$\tilde{x}^e_{i,n-1}$$

be the decoder-reconstruction (which may be corrupted and hence differ from the encoder reconstruction) of the corresponding DCT coefficient in the previous enhancement layer frame. Taking into account all the available information, the optimal estimate to reconstruct the lost DCT coefficient is given by:

$$\tilde{x}^e_{i,n} = E\{x_{i,n} \mid \tilde{x}^e_{i,n-1}, x_{i,n} \in (a_{i,n}, b_{i,n})\}. \quad (3)$$

The estimate in equation (3) may be conveniently approximated by the reconstruction:

$$\tilde{x}^e_{i,n} \cong \rho \tilde{x}^e_{i,n-1} + E\{w_{i,n} \mid w_{i,n} \in (s, t)\} \quad (4)$$

where $$s = a_{i,n} - \rho \tilde{x}^e_{i,n-1} \text{ and } t = b_{i,n} - \rho \tilde{x}^e_{i,n-1}.$$

To evaluate this expectation, the density of $w_{i,n}$ is assumed to be:

$$p(w) = \rho^2 \delta(w) + \frac{(1-\rho^2)}{2} \frac{1}{\alpha} \exp\{-|w|/\alpha\}. \quad (5)$$

Equation (5) can be derived from a Laplace-Markov assumption of the process $x_{i,n}$ in equation (1). Using equation (5), one can readily compute the value of equation (4), (collectively referred to herein as the "Zhang algorithm").

While the Zhang reference jointly exploits information from current base-layer data and previous enhancement-layer data, the reference has some drawbacks. First, in order to run the Zhang algorithm, the parameters ρ and α must be obtained off-line using training, i.e., from a training set. Furthermore, the selected parameters are fixed for whole sequence, making scene-based adaptation difficult. Secondly, in the approximation of equation (4), the quantization noise of previous enhancement-layer data is not incorporated. Thus, equation (4) overly emphasizes the importance of $$\tilde{x}^e_{i,n-1}.$$

Detailed Embodiment

The present invention overcomes the above-mentioned drawbacks of the Zhang reference paper by maintaining the optimality of the Zhang algorithm. Furthermore, the system and method of the present invention can be applicable in an error-free scenario to improve the decoded video.

Referring first to FIG. 1, a scalable decoder 10 is shown that dynamically selects the optimal reconstruction point of the dequantizer 25. Decoder 10 receives an enhancement bitstream 20 and a base layer bitstream 22, and outputs an enhancement layer video 24. Unlike a conventional drift-free scalable decoder, the new decoder 10 contains an additional frame memory 12 to store the previous enhancement video frame. Also included is an additional motion compensation 14 and discrete cosine transform (DCT) 16. Using the additional motion compensation 14 and DCT 16, the information from the previous enhancement frame is incorporated to optimally dequantize enhancement DCT coefficients at the current frame.

Specifically, decoder 10 includes a parameter estimation and optimal reconstruction (PEOR) system 18. The PEOR utilizes an adaptive estimation technique to determine the unknown parameters in equation (5), and an improved reconstruction formula by incorporating the quantization error of $$\tilde{x}^e_{i,n-1}$$

in equation (4).

Figure 2:
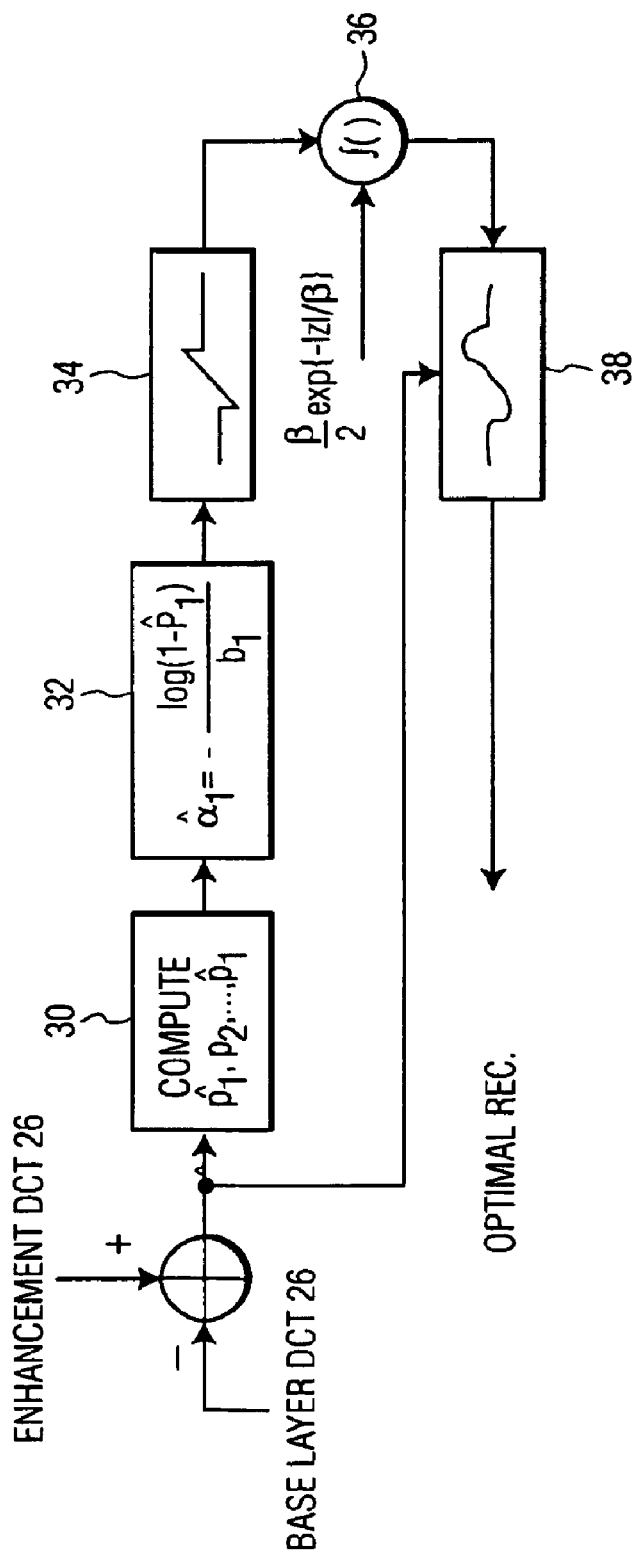
FIG. 2 depicts a Parameter Estimation and Optimal Reconstruction System in accordance with the present invention.

FIG. 2 illustrates the parameter estimation and optimal reconstruction (PEOR) system 18 in greater detail. PEOR system 18 receives a residual between the enhancement layer DCT 26 and base layer DCT 28 information, and outputs an optimal reconstruction $$\tilde{x}^e_{i,n}.$$

As shown in FIG. 2, PEOR system 18 includes: (1) a system 30 for determining the set of quantization occurrences $\hat{p}_j$, which are determined by counting DCT coefficients with a quantizer index of j and then dividing the result by the total number of DCT coefficients; (2) a parameter estimation system 32 for computing α; (3) a system 34 for generating a preliminary reconstruction point; and (4) a noise distribution system 36 for generating the optimal reconstruction point $$\tilde{x}^e_{i,n}.$$

The details of each of these systems are explained below.

It turns out that the Zhang algorithm is robust relative to the parameter ρ in equation (5). Thus, parameter ρ can be hand-picked to ρ≈1 for low frequency DCT coefficients (e.g., 0.99), and ρ<1 for high frequency DCT coefficients (e.g., 0.3), respectively. In case there is no transmission error, the value of ρ is set to zero.

The Zhang algorithm is, however, quite sensitive to parameter α in equation (5). Hence, the present invention provides an adaptive method to estimate α. Since the Laplace-Markov model of equation (5) dictates that $x_{i,n}$ has a Laplacian probability density function (pdf) with parameter α, the estimation problem may be reduced to the parameter estimation problem of a Laplacian distribution. Accordingly, the parameter a can be estimated robustly from its quantized realization within parameter estimation system 32 using the following formula:

$$\hat{\alpha}_l = -\frac{\log(1-\hat{P}_l)}{b_l} \quad (6)$$

where $0<b_l< \ldots <b_L=\infty$ denotes the quantizer decision levels and $$\hat{P}_l = \sum_{j=1}^{l} \hat{p}_l$$

is the normalized frequency of occurrences of data quantized to level 1, 2, ..., 1.1 is then typically chosen such that $\hat{P}_l \cong 1$, but is not identically unity.

Using the Laplace-Markov model of equation (5), it can be shown that the reconstruction formula (4) can be simplified as:

$$\tilde{x}^e_{i,n} = a_{i,n} + d_{i,n}(\rho; \tilde{x}^e_{i,n-1}) \quad (7)$$

where $$d_{i,n}(\rho; \tilde{x}^e_{i,n-1})$$

denotes a reconstruction offset. This formula can be used by system 34 for generating a preliminary reconstruction point. Based on equation (5), a typical shape of the reconstruction point 34 can be generated as depicted in FIG. 3.

Figure 3:
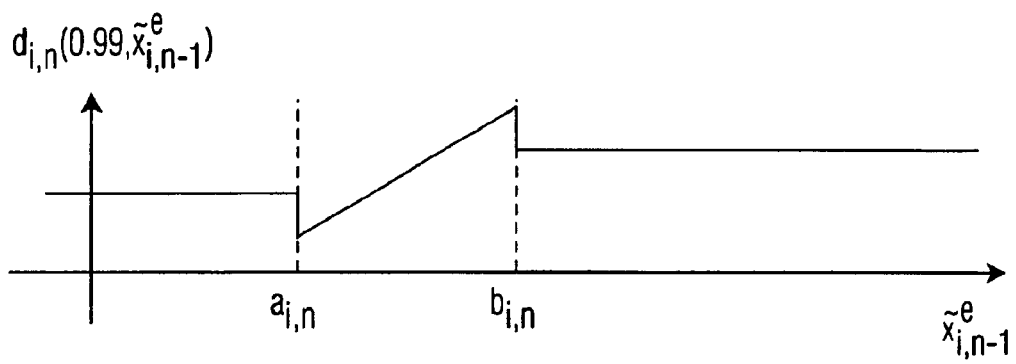
FIG. 3 depicts a reconstruction point.

As shown in FIG. 3, the reconstruction point 34 has discontinuities at the boundaries of the quantization interval, which is counter-intuitive. This phenomenon comes from the assumption that $$\tilde{x}^e_{i,n-1}$$

has no quantization noise.

Figure 4:
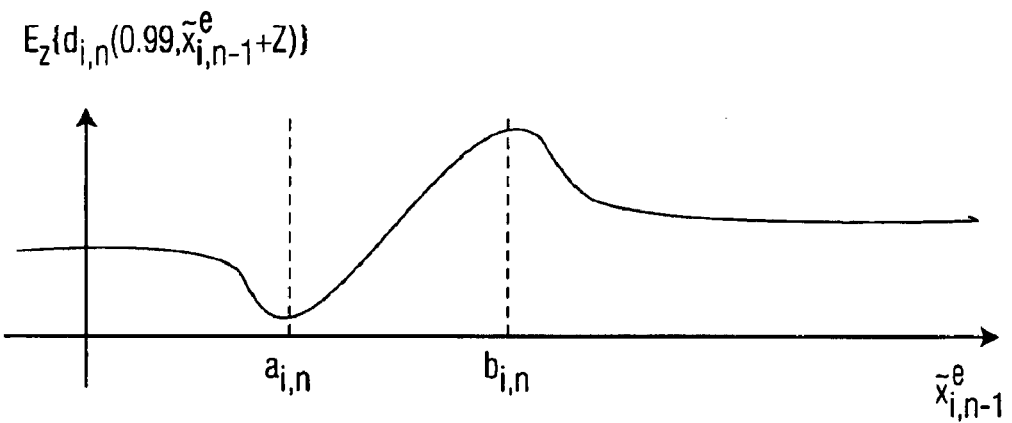
FIG. 4 depicts an optimal reconstruction point determined in accordance with the present invention.

Based on this observation, the optimized reconstruction formula of the present invention is derived directly from formula (3) without approximation. By implementing a noise distribution system 36 to smooth out the discontinuities, the optimal reconstruction point without approximation can be implemented using the equation:

$$\tilde{x}^e_{i,n} = a_{i,n} + E_Z\{d_{i,n}(\rho; \tilde{x}^e_{i,n-1} + Z)\} \quad (8)$$

where Z is a quantization noise. A typical shape 38 of the proposed optimal reconstruction point using equation (8) is given in FIG. 4. The result is that there is no discontinuity at the boundaries.

The distribution of the quantization error (as implemented by noise distribution system 36) can be modeled in any known manner (e.g. zero mean Gaussian or Laplacian). If the error is assumed Laplacian with parameter β, the expectation operation in equation (8) can be implemented as shown in FIG. 2, and the parameter β can be chosen to $\hat{\alpha}_l$.

It is understood that the systems, functions, mechanisms, methods, algorithms and modules described herein can be implemented in hardware, software, or a combination of hardware and software. They may be implemented by any type of computer system or other apparatus adapted for carrying out the methods described herein. A typical combination of hardware and software could be a generalpurpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A scalable decoder system having a decoder reconstruction system, wherein the decoder reconstruction system comprises:
   an estimation algorithm for estimating a lost discrete cosine transform (DCT) coefficient, wherein the estimation algorithm includes a density distribution dependent on at least one unknown parameter $\hat{\alpha}_l$; and
   a parameter estimation algorithm for estimating $\hat{\alpha}_l$ according to the equation:

$$\hat{\alpha}_l = -\frac{\log(1 - \hat{P}_l)}{b_l},$$

wherein $b_l$ denotes each of a set of quantizer decision levels l, and $\hat{P}_l$ is the sum of a set of a normalized frequency of occurrences of data quantized to each quantizer decision level 1,2, ... , l.

2. The scalable decoder of claim 1, wherein $\hat{P}_l$ is chosen to be approximately equal to one.

3. The scalable decoder of claim 1, wherein the estimation algorithm is given by:

$$\tilde{x}_{i,n}^e = a_{i,n} + E_Z\{d_{i,n}(\rho; \tilde{x}_{i,n-1}^e + Z)\},$$

and wherein Z is a quantization noise, $E_z$ is an expectation with respect to quantization noise, $$d_{i,n}(\rho; \tilde{x}_{i,n-1}^e + Z)$$

denotes a reconstruction offset, $$\tilde{x}_{i,n-1}^e$$

is an expectation of a DCT coefficient of a previous frame, $\rho$ equals a predetermined value between −1 and 1, and $a_{i,n}$ is a beginning of a quantization interval.

4. The scalable decoder of claim 3, wherein $\rho$ equals approximately 1 for low frequency DCT coefficients, and less than 1 for high frequency DCT coefficients.

5. A parameter estimation and optimal reconstruction (PEOR) method for use in a scalable decoder, the method comprising:
   determining the set of quantization occurrences;
   estimating a parameter $\alpha$, wherein $\alpha$ is estimated according to the equation $$\hat{\alpha}_l = -\frac{\log(1 - \hat{P}_l)}{b_l},$$

wherein $b_l$ denotes each of a set of quantizer decision levels l, and $\hat{P}_l$ is the sum of a set of a normalized frequency of occurrences of data quantized to each quantizer decision level 1,2, ... ,l;
   generating a preliminary reconstruction point according to the equation $$\tilde{x}_{i,n}^e = a_{i,n} + d_{i,n}(\rho; \tilde{x}_{i,n-1}^e);$$

and
   smoothing the preliminary reconstruction point to generate an optimal reconstruction point.

6. The method of claim 5, wherein the set of quantization occurrences are determined by counting DCT coefficients with a quantizer index of j and then dividing the result by the total number of DCT coefficients.

7. The method of claim 5, wherein the step of smoothing the preliminary reconstruction point is accomplished according to the equation:

$$\tilde{x}_{i,n}^e = a_{i,n} + E_z\{d_{i,n}(\rho; \tilde{x}_{i,n-1}^e + Z)\},$$

wherein Z is a quantization noise, $E_z$ is an expectation with respect to the quantization noise Z, $$d_{i,n}(\rho; \tilde{x}_{i,n-1}^e + Z)$$

denotes a reconstruction offset, $$\tilde{x}_{i,n-1}^e$$

is an expectation of a DCT coefficient of a previous frame, $\rho$ equals a predetermined value between −1 and 1, and $a_{i,n}$ is a beginning of a quantization interval.

8. A parameter estimation and optimal reconstruction (PEOR) system for use in a scalable decoder, comprising:
   a reconstruction system for determining an optimal reconstruction according to the equation:

$$\tilde{x}_{i,n}^e = a_{i,n} + E_z\{d_{i,n}(\rho; \tilde{x}_{i,n-1}^e + Z)\},$$

wherein Z is a quantization noise, $E_z$ is an expectation with respect to quantization noise Z, $$d_{i,n}(\rho; \tilde{x}^e_{i,n-1} + Z)$$

denotes a reconstruction offset, $$\tilde{x}^e_{i,n-1}$$

is an expectation of a discrete cosine transform (DCT) coefficient of a previous frame, $\rho$ equals a predetermined value between −1 and 1, and $a_{i,n}$ is a beginning of a quantization interval.

9. The PEOR system of claim 8, wherein the parameter wherein $\alpha$ is estimated according to the equation:

$$\hat{\alpha}_l = -\frac{\log(1 - \hat{P}_l)}{b_l},$$

wherein $b_l$ denotes each of a set of quantizer decision levels l, and $\hat{P}_l$ is the sum of a set of a normalized frequency of occurrences of data quantized to each quantizer decision level 1,2, . . . , l.

* * * * *